Patented Mar. 13, 1928.

1,662,061

UNITED STATES PATENT OFFICE.

RAY W. HESS AND JOHN C. SIEMANN, OF BUFFALO, NEW YORK, ASSIGNORS TO NATIONAL ANILINE & CHEMICAL CO., INC., OF NEW YORK, N. Y., A CORPORATION OF NEW YORK.

ALKYLATION OF CARBAZOL.

No Drawing.    Application filed January 25, 1922.  Serial No. 531,779.

This invention relates to improvements in the preparation of carbazol derivatives, and more particularly the alkylation of carbazol for the production of N-alkyl derivatives thereof, such as N-ethylcarbazol. The alkylation of carbazol, according to methods heretofore proposed, has involved the preliminary fusion of carbazol with caustic potash to form potassium carbazol, and the treatment of the resulting potassium carbazol with the alkylating agent.

The present invention is based upon the discovery that carbazol can be directly alkylated by subjecting the carbazol to the action of the alkylating agent, for example, of diethyl sulphate, in the presence of a dehydrating or condensing agent, such as finely divided caustic alkali. In the case of the ethylation of carbazol with diethyl sulphate, we have found that the reaction will take place spontaneously and vigorously without application of heat when finely divided caustic soda or caustic potash is present, and when no solvent is present. The invention includes not only the alkylation of carbazol by treatment with alkylating agents of the aliphatic series but also the production of N-aryl or N-aralkyl derivatives by treatment of carbazol with arylating or aralkylating agents of the aromatic series.

The invention includes the further discovery that the desired alkylation is facilitated and improved by carrying out the alkylation, for example, with diethyl sulphate and caustic alkali, in the persence of an inert organic solvent or diluent such as toluene, and more particularly a solvent or diluent which has a boiling point of approximately that temperature at which it is desired to carry out the reaction. In the presence of toluene, for example, the alkylation of carbazol with diethyl sulphate and caustic alkali takes place slowly at ordinary temperatures but can be caused to take place rapidly and completely by heating to about 85° C. or somewhat higher. The invention can be carried out at, below or above atmospheric pressure in the presence or absence of inert solvents or diluents.

The use of an inert organic liquid, such as toluene, enables the temperature to be easily controlled and permits of thorough agitation of the charge, inasmuch as the toluene is itself substantially anhydrous and is not acted upon chemically under the conditions employed, and inasmuch as its boiling point is suitable for the temperature control of the reaction. While the reaction can be carried out without such a solvent or medium, nevertheless the presence of such a solvent or medium is advantageous, for the reasons indicated, namely, the facilitation of the control of the temperature and of the agitation, etc. Among the solvents which can be used may be mentioned solvent naphtha, chlorbenzol, toluene, kerosene, etc., but we have found especially suitable, toluene and steam distilled kerosene of an initial boiling point of 80° to 100° C.

Instead of using diethyl sulphate for the production of ethyl carbazol, other carbazol derivatives can be similarly produced with the use of such other reagents as contained easily replaceable hydrocarbon radicals which will react under similar circumstances; for example, benzyl chloride can be used in the production of benzyl carbazol.

The process can be carried out in various forms and types of apparatus which may be made of different materials, such as iron, glass, etc. Usually, when a solvent such as toluene is employed the apparatus should be provided with a reflux condenser or reflux means for condensing and returning the vaporized toulene so that the temperature of the reaction mixture will be maintained at approximately such boiling point.

The amount of caustic soda which we have found to give best results is somewhat in excess of two moles of caustic soda for one mole each of carbazol and diethyl sulphate. With only one mole of caustic soda only partial ethylation takes place, but as the amount of caustic soda increases the ethylation increases to a maximum when about 2.5 moles of caustic soda are used; but the increase in yield is nearly as great with two moles of caustic soda, and the further increase with more than two moles is small, although appreciable. We recommend accordingly that the amount of caustic soda be in excess of about 2 moles for each mole of carbazol and diethyl sulphate and for best results, the use of about 2.5 moles of caustic soda. Further, the caustic soda employed should advantageously be in a finely divided state, inasmuch as the caustic soda is not in solution in the organic solvent employed. If the particles of caustic soda are too large they may cause the reaction to take place slowly or incompletely, or the ethyl sulphate may be partially decomposed before the ethylation is completed. Complete ethylation can, however, readily be obtained with caustic soda particles of a size about 20 mesh. If the size of the particles is increased, for example, to more than 10 mesh, the speed of ethylation is slower, and difficulty may be met with in obtaining complete ethylation. We recommend accordingly the use of particles of a size not greater than about 10 mesh, that is, passing a 10 mesh sieve.

The amount of diethyl sulphate required for the complete or approximately complete ethylation of carbazol, according to the present invention, is about one mole of diethyl sulphate to one mole of carbazol. The use of a small excess of diethyl sulphate, for example, 10 per cent excess, enables substantially complete ethylation to be readily obtained.

The amount of toluene (or other solvent) can likewise be varied but we have found an amount of toluene corresponding to about one liter of toluene to one gram-mole of carbazol to be about the best concentration. Less toluene can be used without affecting the yield, but the operation is less easy to control, since, after the reaction mixture has been heated to about 85° C., the temperature tends to rise rapidly, and the mass becomes thicker and foams more violently when the amount of toluene is very greatly reduced below the amount indicated. The amount of toluene can be somewhat increased from that above indicated but the capacity of the apparatus is decreased if the proportion of toluene is increased.

It is important in carrying out the process of the present invention, to avoid the presence of any considerable amount of water in the toluene. A limited amount of water, for example, up to about 0.5 cc. of water per 100 cc. of toluene, does not appear to have any appreciable effect on the reaction, but if the amount of water is appreciably increased the yield of ethyl carbazol is decreased, and, in addition, lumps tend to be formed during the reaction. Accordingly, the reagents employed should not introduce an objectionable amount of water into the reaction mixture. The amount of water introduced with the caustic soda should accordingly by low, for example, the caustic soda should contain preferably not more 2-3 per cent of water.

The ethylation of carbazol takes place rapidly and requires only a short time for its substantial completion; but continued heating under reflux conditions for a considerable time does not appear to affect the yield or the quality of the ethylcarbazol produced.

The invention will be further illustrated by the following specific example, the parts indicated being by weight:

In a steam jacketed iron kettle, equipped with an agitator and with a reflux condenser, 880 parts of toluene, 167 parts of carbazol and 100 parts of caustic soda are charged, the caustic soda being in the form of a powder or in granules, all of which will pass a screen of 10 meshes to the linear inch. There is then added 154 parts of diethyl sulphate and the mixture is heated with agitation to a temperature of 85° C., and the temperature is then gradually increased, taking care that the reaction does not become too vigorous. The reaction mixture is finally heated to boiling for about 1 hour or until the reaction is complete.

Steam is then passed into the reaction mixture until the toluene is removed by steam distillation. The toluene thus removed may be recovered for further use. The residual mixture containing ethyl carbazol and dilute caustic is then allowed to separate into two layers, the oily product is separated from the aqueous layer and washed by agitation with water at a temperature sufficiently high (e. g. 70 to 100° C.) to keep the product in a molten condition. The product can be separated as a liquid or it can be cooled with the final wash water while vigorous agitation is continued so that the product will be reduced to a fine state of division. The resulting finely divided product can be separated by filtration and dried at about 60° C.

The proportions and temperature mentioned in the above example can be varied, as well as the particular method of procedure. For example, the mixture of toluene, carbazol and caustic soda can be heated to boiling and the diethyl sulphate then added gradually to the boiling solution. So also, the method of isolation may be varied. For example, at the completion of the ethylation, the reaction mixture can be washed with water to remove the salts and alkali present, the aqueous washings separated from the toluene solution of the ethyl carbazol, the latter solution steam distilled until free from toluene, and the aqueous residue containing the ethyl carbazol as an oily suspension can then be cooled with vigorous agitation, thereby solidifying the ethyl carbazol into fine particles which can be filtered off and dried.

The ethyl carbazol produced in the manner described is substantially free from by-products. If a higher degree of purity is required it may be purified, for example, by recrystallization from ethyl alcohol. Pure ethyl carbazol melts at 69.90° C.

It will thus be seen that the present invention provides an improved method for the production of N-derivatives of carbazol.

It will be seen that the process is one which can be carried out at relatively low temperatures and at atmospheric pressure, and that the reaction goes smoothly and easily to substantial completion. The process moreover is not wasteful, and injurious or objectionable by-products are not formed. The control of the reaction is, moreover, facilitated by the use of a solvent, while the process yields a product substantially free from by-products. The invention is applicable to the production of other products than ethyl carbazol, for example, to the production of methyl carbazol, using dimethyl sulphate as the methylating agent, although the alkylation does not take place as readily in this case. Other alkylating agents can also be used. Instead of using caustic soda, caustic potash can similarly be used, although we have found that caustic potash is unnecessary, and that caustic soda can advantageously be used, whereas, in the process of the prior art in which the carbazol is first converted into its alkali metal salt, caustic potash appears to be necessary to produce the potassium carbazol, and caustic soda does not appear to be available for use in a similar way for the production of sodium carbazol. The invention is also applicable to a limited extent to the production of N-alkyl derivatives of C-derivatives of carbazol.

In the claims we use the term "alkylating agent" in a generic sense to include not only the alkylating agents of the aliphatic series, but also, as equivalents, those compounds in which a hydrogen atom of the alkyl group is replaced by an aryl group or radical.

In certain of the claims the words "acid binding agent" are used to cover strongly alkaline agents which are capable of binding or combining with the acid radical of the alkylating agent.

We claim:

1. The method of making an N-derivative of carbazol which comprises causing carbazol to react with an alkylating agent of the aliphatic series in the presence of an acid binding agent.

2. The method of making an N-derivative of carbazol which comprises causing carbazol to react with an alkylating agent in the presence of finely divided caustic alkali.

3. The method of making an N-derivative of carbazol which comprises causing carbazol to react with an alkylating agent in the presence of caustic alkali and of an organic liquid chemically indifferent under the conditions of the process.

4. The method of making an N-derivative of carbazol which comprises subjecting carbazol in the presence of an acid binding agent to the action of an alkylating agent containing an acid radical attached to an aliphatic carbon atom.

5. The process of manufacturing N-ethylcarbazol which comprises treating carbazol with an ethylating agent in the presence of an acid binding agent.

6. The process of manufacturing N-ethylcarbazol which comprises treating carbazol with diethyl sulphate in the presence of an acid binding agent.

7. The process of manufacturing N-ethylcarbazol which comprises treating carbazol with an ethylating agent in the presence of solid caustic alkali without previous formation and isolation of an alkali metal derivative of carbazol.

8. The process of manufacturing N-ethylcarbazol which comprises treating carbazol with diethyl sulphate in the presence of solid caustic alkali without previous formation and isolation of an alkali metal derivative of carbazol.

9. The process of manufacturing N-ethylcarbazol which comprises treating carbazol with an ethylating agent in the presence of solid caustic alkali and of an organic liquid chemically indifferent under the conditions of the process.

10. The process of manufacturing N-ethylcarbazol which comprises treating carbazol with diethyl sulphate in the presence of solid caustic alkali and of an organic liquid chemically indifferent under the conditions of the process.

11. The method of manufacturing N-ethylcarbazol which comprises treating carbazol with diethyl sulphate and finely divided solid caustic soda, the proportions of carbazol, diethyl sulphate, and solid caustic soda being about one mole of carbazol to about one mole of diethyl sulphate, and about two moles or somewhat more of caustic soda.

12. The method of manufacturing N-ethylcarbazol which comprises treating carbazol with diethyl sulphate and finely divided solid caustic soda, the proportions of carbazol, diethyl sulphate, and solid caustic soda being about one mole of carbazol to about one mole of diethyl sulphate, and about two moles or somewhat more of caustic soda, the process being carried out in the presence of an organic liquid having a boiling point approximately that of the desired reaction.

13. The method of manufacturing N-ethylcarbazol which comprises treating carbazol with diethyl sulphate and finely divided solid caustic soda, the proportions of carbazol, diethyl sulphate, and solid caustic soda being about one mole of carbazol to about one mole of diethyl sulphate, and about two moles or somewhat more of caustic soda, the reaction being carried out in the presence of toluene in amount equivalent to about one liter or less of toluene for each gram-mole of carbazol.

14. The process of manufacturing N-ethyl-carbazol which comprises mixing carbazol, caustic soda and toluene with an amount of diethyl sulphate approximately equivalent molecularly to the carbazol present and heating the mixture to about 85° C. and then to the boiling point of the toluene and maintaining the mixture at the boiling point until the reaction is complete, then distilling off the toluene by steam distillation and recovering the ethyl carbazol.

15. The method of making an N-derivative of a carbazol compound which comprises treating a carbazol compound which is free from N-substituents in the pyrrol ring of the carbazol nucleus with an alkylating agent in the presence of alkali and of an inert organic diluent.

16. The method of making an N-alkyl derivative of a carbazol compound which comprises treating a carbazol compound which carries no substituent in the imino group of the pyrrol ring of the carbazol nucleus with a dialkyl sulfate of the aliphatic series in the presence of alkali.

17. The method of making an N-alkyl derivative of a carbazol compound which comprises treating a carbazol compound which carries no substituent in the imino group of the pyrrol ring of the carbazol nucleus with a dialkyl sulfate of the aliphatic series in the presence of alkali and of an inert organic solvent.

18. The method of making N-alkyl derivatives of carbazol which comprises treating carbazol with a dialkyl sulfate of the aliphatic series in the presence of alkali.

19. The method of making N-alkyl derivative of carbazol which comprises treating carbazol with a dialkyl sulfate of the aliphatic series in the presence of alkali and of an inert organic solvent.

20. The method of making N-alkyl derivatives of carbazol which comprises treating carbazol with a dialkyl sulfate of the aliphatic series in the presence of alkali and toluene.

21. In the process of alkylating carbazol by treating it with a dialkyl sulfate of the aliphatic series in the presence of caustic alkali, the step causing the reaction to occur in the presence of an indifferent organic solvent.

22. In the process of alkylating carbazol by treating it with a dialkyl sulfate of the aliphatic series in the presence of caustic alkali, the step causing the reaction to occur in the presence of toluene.

23. The method of introducing a hydrocarbon radical into a carbazol compound which comprises inducing a reaction between a carbazol compound in which the imino group of the pyrrol ring of the carbazol nucleus is free from a substituent and an alkylating agent of the aliphatic series in the presence of caustic alkali.

24. The method of introducing a hydrocarbon radical into carbazol which comprises inducing a reaction between carbazol and an alkylating agent of the paraffine series in the presence of caustic soda.

In testimony whereof we affix our signatures.

RAY W. HESS.
JOHN C. SIEMANN.